United States Patent
Khosravi et al.

(10) Patent No.: US 9,619,242 B2
(45) Date of Patent: Apr. 11, 2017

(54) METHODS, SYSTEMS AND APPARATUS TO INITIALIZE A PLATFORM

(71) Applicant: Intel Corporation, Santa Clara, CA (US)

(72) Inventors: Hormuzd M. Khosravi, Portland, OR (US); Adrian R. Pearson, Beaverton, OR (US); Ned M. Smith, Beaverton, OR (US); Abhilasha Bhargav-Spantzel, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/581,309

(22) Filed: Dec. 23, 2014

(65) Prior Publication Data
US 2016/0179554 A1 Jun. 23, 2016

(51) Int. Cl.
| | | |
|---|---|---|
| G06F 17/00 | (2006.01) | |
| H04L 29/06 | (2006.01) | |
| G06F 9/44 | (2006.01) | |
| G06F 21/57 | (2013.01) | |
| G06F 21/31 | (2013.01) | |

(52) U.S. Cl.
CPC ............ *G06F 9/4406* (2013.01); *G06F 9/441* (2013.01); *G06F 9/4418* (2013.01); *G06F 21/31* (2013.01); *G06F 21/575* (2013.01)

(58) Field of Classification Search
CPC ....... G06F 9/4406; G06F 21/575; G06F 21/31
USPC .......................................................... 726/1
See application file for complete search history.

(56) References Cited

U.S. PATENT DOCUMENTS

| | | | | |
|---|---|---|---|---|
| 5,970,227 | A | * | 10/1999 | Dayan ..................... G06F 21/88 340/5.3 |
| 8,566,571 | B2 | * | 10/2013 | Beachem .............. G06F 9/4406 713/1 |
| 2002/0112155 | A1 | | 8/2002 | Martherus et al. |
| 2003/0093658 | A1 | | 5/2003 | Wen et al. |
| 2006/0156385 | A1 | | 7/2006 | Chiviendacz et al. |
| 2007/0234408 | A1 | | 10/2007 | Burch et al. |
| 2008/0086770 | A1 | | 4/2008 | Kulkarni et al. |
| 2008/0148387 | A1 | * | 6/2008 | Madina ................. G06F 9/4411 726/16 |
| 2008/0175379 | A1 | | 7/2008 | Hansen et al. |
| 2009/0089569 | A1 | * | 4/2009 | Baribault ................ G06F 15/16 713/2 |

(Continued)

OTHER PUBLICATIONS

Benjie Chen; Certifying Program Execution with Secure Processors; MIT Lab; USENIX: year:2003; pp. 1-8.*

(Continued)

*Primary Examiner* — Monjour Rahim
(74) *Attorney, Agent, or Firm* — Hanley, Flight & Zimmerman, LLC

(57) ABSTRACT

Methods, apparatus, systems and articles of manufacture are disclosed to initialize a platform. An example disclosed apparatus includes a boot loader manager to prevent operating system loading in response to detecting a power-on condition, a context manager to retrieve first context information associated with the platform, and a policy manager to identify a first operating system based on the first context information, the policy manager to authorize the boot loader manager to load the first operating system.

22 Claims, 9 Drawing Sheets

(56) References Cited

U.S. PATENT DOCUMENTS

| | | | |
|---|---|---|---|
| 2009/0165125 A1 | 6/2009 | Brown et al. | |
| 2009/0180430 A1 | 7/2009 | Fadell | |
| 2009/0187962 A1 | 7/2009 | Brenneman et al. | |
| 2009/0327675 A1* | 12/2009 | Cherian | G06F 9/4401 713/1 |
| 2010/0023755 A1 | 1/2010 | Kotani et al. | |
| 2010/0043056 A1 | 2/2010 | Ganapathy | |
| 2010/0097386 A1 | 4/2010 | Kim et al. | |
| 2010/0153696 A1* | 6/2010 | Beachem | G06F 9/4406 713/2 |
| 2011/0016301 A1 | 1/2011 | Galicia et al. | |
| 2011/0055537 A1 | 3/2011 | Yang | |
| 2011/0320535 A1 | 12/2011 | Donaldson | |
| 2012/0032945 A1* | 2/2012 | Dare | G06F 3/0481 345/418 |
| 2012/0079271 A1 | 3/2012 | Cordeiro et al. | |
| 2013/0055379 A1 | 2/2013 | Adams et al. | |
| 2014/0007253 A1 | 1/2014 | Hardt | |
| 2014/0137101 A1* | 5/2014 | Chan | H04L 67/34 717/176 |
| 2014/0215236 A1* | 7/2014 | Heinrich | G06F 1/329 713/320 |
| 2015/0052616 A1* | 2/2015 | Hutchison | G06F 21/53 726/27 |
| 2016/0066184 A1 | 3/2016 | Bhargav-Spantzel et al. | |

OTHER PUBLICATIONS

International Searching Authority, "International Search Report," issued in connection with International Patent Application No. PCT/US2015/060883, mailed Mar. 31, 2016 (4 pages).

International Searching Authority, "Written Opinion," issued in connection with International Patent Application No. PCT/US2015/060883, mailed Mar. 31, 2016 (9 pages).

International Searching Authority, "International Search Report and Written Opinion," issued in connection with International Patent Application No. PCT/US2015/037623, mailed Oct. 7, 2015 (11 pages).

United States Patent and Trademark Office, "Non-Final Office Action," issued in connection with U.S. Appl. No. 14/472,645, mailed Oct. 15, 2015 (25 pages).

Ben-Shalom et al., "Granular Trust Model Improves Enterprise Security," Intel, Nov. 2012 (8 pages).

Ben-Shalom et al., "Rethinking Information Security to Improve Business Agility," Intel, Jan. 2011 (8 pages).

Intel, "Software Guard Extensions Programming Reference," Sep. 2013 (156 pages).(NPL in 4 parts).

International Searching Authority, "International Search Report," issued in connection with International Patent Application No. PCT/US2015/016804, May 27, 2015 (4 pages).

International Searching Authority, "Written Opinion," issued in connection with International Patent Application No. PCT/US2015/016804, May 27, 2015 (5 pages).

U.S. Appl. No. 14/229,200, filed Mar. 28, 2014.

U.S. Appl. No. 14/472,645, filed Aug. 29, 2014.

IEEE 1667 Working Group, "IEEE 1667 Introduction and Overview: Standard for Discovery, Authentication, and Authorization in Host Attachments of Storage Devices," Mar. 29, 2013 (28 pages).

Anati et al., "Innovative Technology for CPU Based Attestation and Sealing," Intel Corporation, 2013 (7 pages).

Hoekstra et al., "Using Innovative Instructions to Create Trustworthy Software Solutions," Intel Corporation, 2013 (8 pages).

McKeen et al., "Innovative Instructions and Software Model for Isolated Execution," Intel Corporation, 2013 (8 pages).

Wikipedia, "IEEE 802.11i-2004," Jul. 6, 2014, retrieved from <http://en.wikipedia.org/wiki/IEEE_802.11i-2004>, retrieved on Aug. 6, 2014 (5 pages).

* cited by examiner

PLATFORM PROFILE TABLE

300 ⬈

| SSID (302) | OS PRIVILEGE (304) | DISK PRIVILEGE (306) | PRIVILEGE ELEVATE (308) | POST HIB./SLEEP (310) |
|---|---|---|---|---|
| Office_1 | Enterprise (Full Privileges) | Vol. 1-4 (Full Privileges) | n/a (312) | If wake in same SSID, then no OS/Disk change. Else boot LOW. (314) * Authenticate w/ keyboard password, NFC and facial rec. (316) |
| Home | Win7 (Intermediate Privileges) | Vol. 1-3 (Intermediate Privileges) | If VPN, then FULL. | If wake in same SSID, then no OS/Disk change. Else boot LOW. * Authenticate w/ voice rec. and facial rec. (318) |
| MainStreet Coffee (320) | Cloud OS (Low Privileges) | Vol. 1 (Low Privileges) | If VPN, then FULL. (322) | Always re-authenticate and boot with LOW privileges. * Authenticate w/ keyboard password and authorized Bluetooth device proximity. |
| Tether | Cloud OS (Low Privileges) | Vol. 1 (Low Privileges) | If VPN, then FULL. If proximate to client facility, then Intermediate privileges. | Always re-authenticate and boot with LOW privileges. * Authenticate w/ voice and fingerprint. |
| ClientFacility | Win7 (Intermediate Privileges) | Vol. 1-3 (Intermediate Privileges) | If VPN, then FULL. | If wake in same SSID, then no OS/Disk change. Else boot LOW. |
| Unknown | Cloud OS (Low Privileges) | Vol. 1 (Low Privileges) | If VPN plus Tether plus SmartCard, then FULL. | Always require Tether and SmartCard if unknown SSID. |

METHODS, SYSTEMS AND APPARATUS TO INITIALIZE A PLATFORM

FIELD OF THE DISCLOSURE

This disclosure relates generally to computing device security, and, more particularly, to methods, systems and apparatus to initialize a platform.

BACKGROUND

In recent years, security breaches have become more frequent. Users of platforms (e.g., computing devices) typically enter a password to gain access to their respective computing devices, and some users apply the same password for one or more other services (e.g., financial accounts) accessed via the computing device. In the event that the user password is revealed, stolen and/or otherwise utilized by an unauthorized person or entity, harm may result from the unauthorized access to the computing device and/or services.

BRIEF DESCRIPTION OF THE DRAWINGS

FIG. 3 is an example platform profile table used by the example system of FIGS. 1 and 2 to initialize a platform.

DETAILED DESCRIPTION

Mobile devices enable a substantial productivity improvement for users due to advances in portable computing power, battery life and network connectivity. However, the relatively small size of such mobile devices also increases the ease at which a thief may steal the devices. In some cases, the thief may observe the owner of a mobile device prior to stealing it so that authentication credentials may be obtained. For example, the thief may observe password keyboard entry activity by the owner prior to stealing the mobile device. Accordingly, the thief may use such authentication information after stealing the mobile device so that access to privileged disk information and/or network system access may occur.

Figure 1:
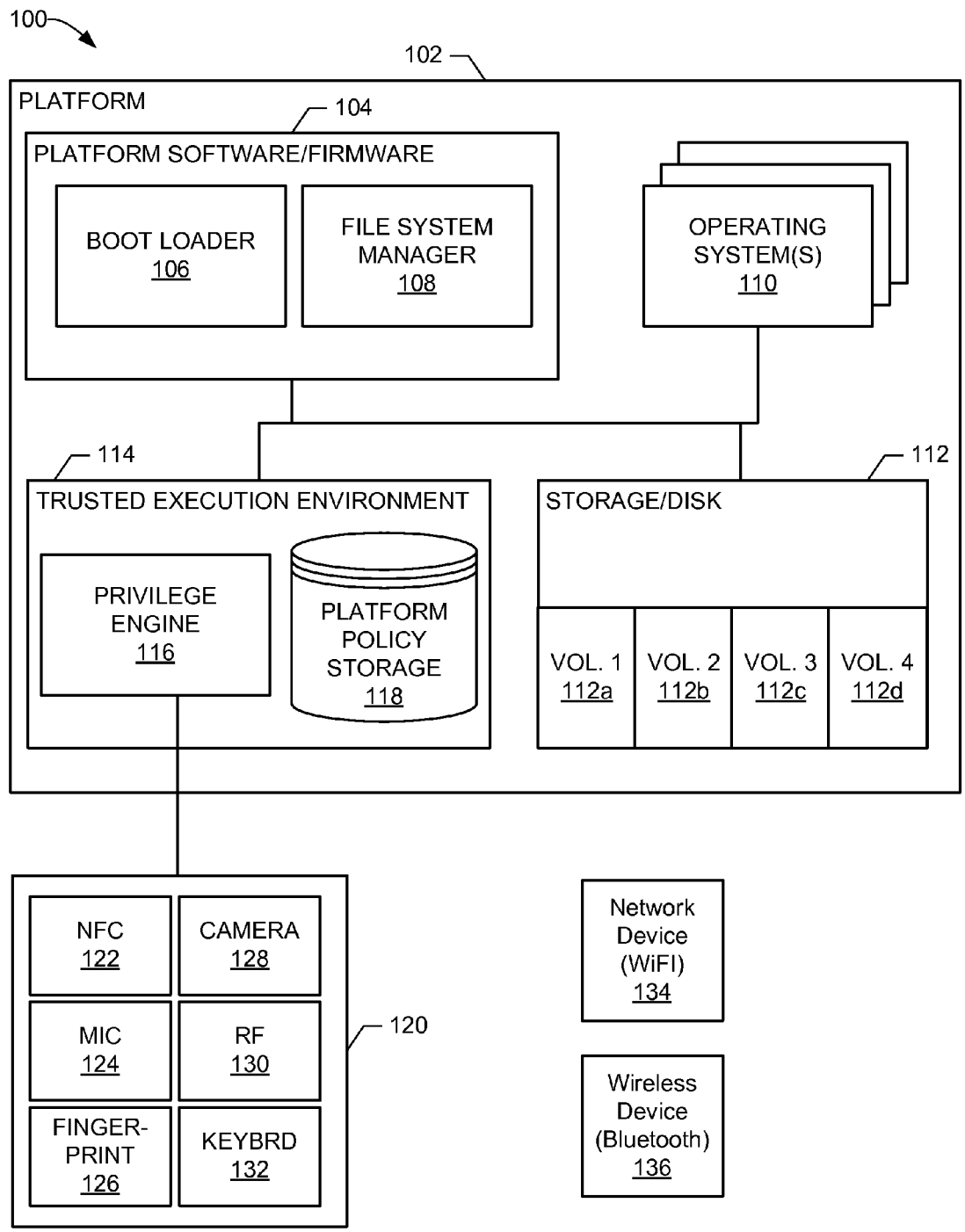
FIG. 1 is a schematic illustration of a system to initialize a platform.

FIG. 1 is an example system 100 to initialize a platform 102 in connection with context information and platform policy instructions. The example platform 102 of FIG. 1 may be a mobile computing device, such as a mobile telephone, a tablet, a laptop computer, a netbook, etc. In the illustrated example of FIG. 1, the platform 102 includes platform software/firmware 104, such as a boot loader 106 and a file system manager 108.

In some examples, the file system manager 108 conforms to one or more specifications developed by the Trusted Computing Group (TCG) in which a storage device (e.g., a disk drive) may be divided into any number of partitions, in which each partition may be referred to as a volume having its own encrypted locking range. The example boot loader 106 of FIG. 1 is responsible for loading an example operating system (OS) 110 based on a platform policy and corresponding context information, as described in further detail below.

The example file system manager 108 is communicatively connected to storage 112 (platform storage), in which one or more volumes of the example storage 112 include a first volume 112a, a second volume 112b, a third volume 112c and a fourth volume 112d. Each of the volumes 112a-112d are made available to the example platform 102 based on the platform policy and corresponding context information, as described in further detail below.

The example platform 102 of FIG. 1 also includes a trusted execution environment (TEE) 114, which includes an example privilege engine 116 and platform policy storage 118. In some examples, the TEE 114 includes its own media access control (MAC) address and/or Internet protocol (IP) address to facilitate out-of-band (OOB) communications independent and/or otherwise separate from the example platform 102. The example TEE 114 may be implemented as the Intel® Management Engine (ME), or in a manner consistent with the TCG as a trusted platform module (TPM). In some examples, the TEE 114 includes one or more cryptographic processor(s), secured input/output (I/O), random number generator(s), key generator(s), hash generator(s), platform configuration registers (PCRs), and/or keys (e.g., storage root keys, attestation identity keys, etc.).

The example TEE 114 of FIG. 1 operates as an authentication engine to enable one or more inputs and/or types of input to be used when attempting to gain access privileges of the example platform 102. In particular, the example privilege engine 116 is communicatively connected to authentication sensors 120. The example authentication sensors 120 of FIG. 1 include a near field communications (NFC) transceiver 122, a microphone 124, a fingerprint reader 126, a camera 128, a radio frequency (RF) transceiver 130 and a keyboard 132. While six (6) sensor types are shown with the example authentication sensors 120, additional and/or alternative sensor types may be considered, without limitation. In some examples, the NFC transceiver 122 interacts with an employee identification card/badge and/or the RF transceiver 130 interacts with a network device 134 having a Wi-Fi signal, such as a network router, and/or the RF transceiver 130 interacts with a mobile device 136 having a Bluetooth signal, such as a wireless telephone.

Figure 2:
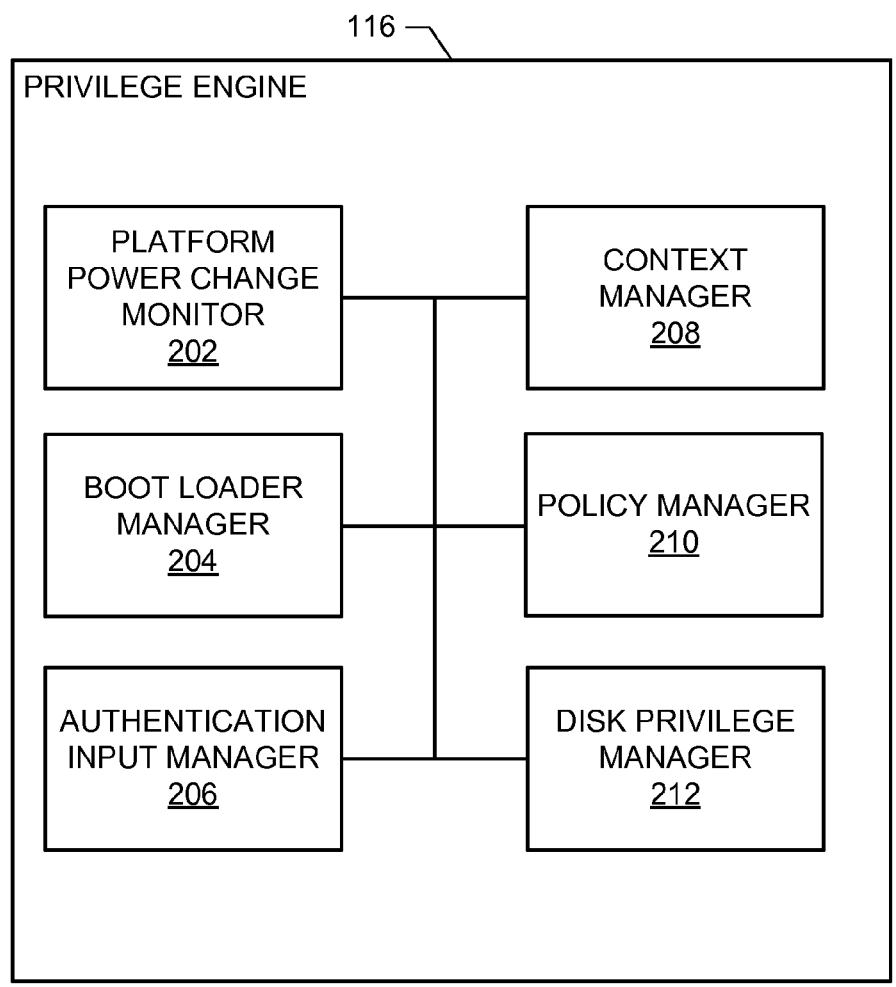
FIG. 2 is a schematic illustration of a privilege engine of FIG. 1.

FIG. 2 illustrates additional detail of the example privilege engine 116 of FIG. 1. In the illustrated example of FIG. 2, the privilege engine 116 includes a platform power change monitor 202, a boot loader manager 204, an authentication input manager 206, a context manager 208, a policy manager 210 and a disk privilege manager 212.

In operation, the example platform power change monitor 202 determines whether there has been a power state change of the example platform 102. Additionally, the example platform power change monitor 202 distinguishes between one or more different types of power-on conditions, such as a cold boot power-on condition, a power-on condition from a prior sleep state, or a power-on condition from a prior hibernate state. For example, if the platform 102 is in a prior powerless state and is turned on, which is sometimes referred to as a cold boot or hard boot, the platform software/firmware 104 typically accesses a reset vector for a processor of the platform 102 to begin execution. Additionally, when the example platform 102 begins execution from a prior powerless state, one or more power-on-self-test (POST) operations are initiated to bring one or more portions of the example platform 102 in a proper state for operation (e.g., verifying processor register states, verifying component presence and/or integrity (e.g., timers, interrupt controllers, direct memory access devices, etc.), determining system main memory location(s) and corresponding size(s), and initializing the basic input/output system (BIOS)).

The cold boot also includes invocation of the example boot loader 106 to begin loading an OS for the example platform 102. However, because a default OS loaded by the example boot loader 106 may introduce one or more security risks to the platform 102, example methods, apparatus, systems and/or articles of manufacture disclosed herein determine which one of any number of OSs to load based on platform policy and contextual information. As used herein, contextual information and/or context refer to environmental conditions of the example platform 102. Environmental conditions may include, but are not limited to, Wi-Fi signals proximate to the example platform 102, Bluetooth signals proximate to the example platform 102 and/or NFC signals proximate to the example platform 102. As disclosed in further detail below, the platform policy (e.g., one or more policies stored in the example platform policy storage 118) instructs the example privilege engine 116 to boot a particular OS based on (a) context, (b) multi-factor inputs and/or (c) a prior operating state of the example platform 102 (e.g., a prior powerless state, a prior sleep state, a prior hibernate state, etc.).

Continuing with the example privilege engine 116 in the illustrated examples of FIGS. 1 and 2, if the example platform power change monitor 202 determines that the platform was previously in a powerless state, thereby causing a cold boot, then the example boot loader manager 204 intercepts the example boot loader 106 to prevent it from loading a default OS for the example platform 102. The example authentication input manager 206 invokes the example authentication sensors 120 to retrieve authentication information from a user of the example platform 102. As described above, the authentication information may include input from the example NFC transceiver 122 based on proximity to an authorized employee identification card (e.g., an employee identification card containing an NFC tag). In other examples, the authentication information may include input from the microphone 124 to capture a voiceprint from the user to be compared against a reference voiceprint (e.g., a voiceprint reference stored in the example platform policy storage 118 of the example TEE 114). In still other examples, the authentication information may include input from the fingerprint reader 126 to capture a fingerprint scan of the user to be compared against an authorized reference fingerprint. In some examples, the authentication information may include input from the camera 128 to capture an image of the user to be compared against an authorized reference image. In still other examples, the authentication information may include input from a keyboard to obtain one or more passwords to be compared against authorized passwords stored in the TEE 114. In still other examples, one or more combinations of inputs may be retrieved and compared to identify a multi-factor authentication that, when each factor is individually authorized, permits the user to utilize one or more resources of the platform 102.

While multi-factor authentication inputs reduce a risk of unauthorized access to the platform and/or resources available to the platform (e.g., hard drive storage information, network resource access, cloud-accessible storage access, etc.), some environments of the example platform 102 present greater or lesser degrees of risk. For example, public locations such as coffee shops, restaurants, airports and/or libraries typically exhibit a relatively higher degree of risk due to greater numbers of unknown people having access to those locations and the ability of those people to observe and/or otherwise monitor the behaviors of the owner of the example platform 102. In some cases, a would-be hacker or thief may systematically observe the user to identify particular keyboard keystrokes that reflect a password. Further, in the event the thief subsequently steals the platform 102, then the resources of the platform 102 may be available to the thief.

In other examples, the would-be thief conducts observations using a network sniffer and/or packet analyzer to capture input data associated with the multi-factor authentication. Such collected authentication input data may be used at a subsequent time for access to the platform 102 and/or platform resources in the event the platform 102 is stolen. While examples involving theft are described above, examples disclosed herein are not limited to such circumstances. For instance, sensitive data stored on the example platform 102 and/or accessible via the example platform 102 (e.g., via network connections, via cloud-based services, etc.) may be accessible to non-authorized persons and/or personnel via non-malicious and/or inadvertent activities.

To reduce the possibility of unauthorized access (either malicious or non-malicious), the example policy manager 210 accesses a platform policy from the platform policy storage 118 of the example TEE 114 and instructs the example boot loader 106 to load an OS based on context information associated with the example platform 102. Additionally, the example disk privilege manager 212 instructs the example file system manager 108 to provide or disable one or more volumes of the storage 112 based on the context information associated with the example platform 102.

For example, in the event the platform 102 is powered-on and the context manager 208 detects a service set identifier (SSID) associated with an authorized enterprise network associated with a user of the platform 102 (e.g., an SSID known to be located in an office, laboratory, etc.), then the platform profile may indicate a particular level of access be granted to the platform 102. On the other hand, in the event the context manager 208 detects a SSID associated with an authorized network within the user's home (e.g., home office), then the platform profile may indicate an alternate (e.g., relatively lower) level of access. In some examples, the enterprise network is a relatively highest privilege level in which the platform 102 may load an enterprise OS image and full access to all volumes of the storage 112 are available to the user when the platform 102 is near the enterprise SSID. However, the platform profile may cause the platform 102 to load an alternate OS image having fewer enterprise-level privileges when the SSID associated with the user's home is detected during boot. Moreover, the platform profile may cause the platform 102 to load a lowest-privileged OS when the SSID is unrecognized and/or associated with known public places (e.g., airports, coffee shops, etc.). As such, as environmental risks increase, example methods, apparatus, systems and/or articles of manufacture disclosed herein adjust platform privileges to reduce unauthorized access to the example platform 102 and/or services thereof.

FIG. 3 illustrates an example platform profile table 300, which includes an example SSID column 302, an OS privilege column 304, a disk privilege column 306, a privilege elevate column 308 and a post hibernate/sleep column 310. In the illustrated example of FIG. 3, the SSID column 302 includes known SSIDs that have a corresponding privilege configuration. For example, in the event the context manager 208 detects an SSID named "Office_1," then the policy manager 210 retrieves the profile table 300 stored in the platform policy storage 118 to determine a corresponding OS to load from the OS privilege column 304. In some examples, the policy manager 210 performs one or more comparisons of retrieved context information with one or more fields of the example platform profile table 300 to determine (a) which OS to load and (b) a corresponding storage (disk) privilege condition. In the illustrated example of FIG. 3, the "Office_1" SSID authorizes a highest level OS to be loaded (e.g., an Enterprise OS). Additionally, the disk privilege column 306 authorizes full access privileges to the storage 112 when the "Office_1" SSID is detected.

In some examples, the platform 102 may be elevated to a relatively higher privilege level, thereby allowing relatively greater access to local storage 112 information and/or relatively more capable and/or functional OS images. In the event a particular SSID includes an option to elevate one or more privileges of the example platform, the example privilege elevate column 308 identifies the necessary conditions before that may occur. Continuing with the example "Office_1" SSID of FIG. 3, because the Enterprise OS is already authorized, no further opportunities to elevate the privilege exist. However, assuming for the sake of this example that the context manager 208 detects "Home" as the SSID, then the example privilege elevate column 308 instructs the platform to establish an authorized virtual private network (VPN) before the Enterprise OS may be loaded.

While examples disclosed above include the platform 102 in a prior powerless state, example methods, apparatus, systems and/or articles of manufacture disclosed herein are not limited thereto. In some examples, the platform is in a prior sleep state or a prior hibernate state before a power-up state is invoked (e.g., a user press of the power button). Generally speaking, the sleep state of a platform is an energy saving state in which on-board platform memory (e.g., random access memory (RAM)) stores user data and processor register data before shutting-down other platform components (e.g., disabling power to the hard drive to save energy otherwise spent on spinning). A relatively small amount of power is used by the platform while in the sleep state to preserve platform user state information in the memory. The hibernate state, on the other hand, transfers all user data and processor register data to hard disk storage rather than to memory. As such, the hibernate state of the platform does not consume energy to maintain the state.

When a typical platform comes out of a sleep or hibernate state, the boot loader of that platform is not invoked because the OS image previously loaded will again resume operation. Additionally, security measures for the typical platform when exiting the sleep or hibernate state are managed and/or otherwise controlled by OS policy. This OS policy usually requires a minimal level of security to access platform resources after the sleep or hibernate state, such as a keyboard entry password. One security concern associated with the typical post-sleep or post-hibernate operation is that the OS password policy is weak and the same OS image will be available to the user (e.g., a thief) even when the post-sleep or post-hibernate state occurs in a less-secure location (e.g., a coffee shop).

In response to the example platform power change monitor 202 detecting that the example platform 102 powers-up after a sleep or hibernate state (rather than from a cold/hard boot), then the context manager 208 is invoked to intercept any OS-based security policy, and re-acquire context information. Prior to authorizing any resources of the example platform 102, the example authentication input manager 206 prompts the user of the platform 102 for authentication input credentials based on the example platform profile table 300. In particular, the example post hibernate/sleep column 310 identifies the type of authentication credentials when the detected SSID is associated with "Office_1" 316. On the other hand, in the event the example platform 102 emerges from the sleep/hibernate state and is proximate to the SSID name "Home," then the example authentication input manager 206 prompts the user for alternate input credentials 318.

Returning to the illustrated example of FIG. 3, the example policy manager 210 compares the new context information to the post hibernate/sleep column 310 corresponding to the previously detected SSID. In other words, the example policy manager 210 determines whether a prior platform state is different than a currently detected platform state. Assuming that the previously detected SSID was "Office_1" when the example platform 102 entered the sleep/hibernate mode, then the post hibernate/sleep column 310 indicates that no change to the OS needs to occur if the currently detected SSID hasn't changed 312 (i.e., the currently detected SSID is still "Office_1"). In other words, the previously established OS privilege and/or disk privilege status is maintained when the example platform 102 is powered on after the sleep or hibernate state. On the other hand, in the event that the currently detected SSID is no longer the same SSID as it was when the sleep/hibernate state started (i.e., "Office_1,") then the example post hibernate/sleep column 310 indicates that the example platform should not re-enable the Enterprise OS, but rather change the OS to a low priority image and remove storage access privileges 314. In other words, the previously established OS and/or disk privilege status is prohibited on the example platform 102 when it is powered on having a different SSID (and/or other context identifiers).

In some examples, a dynamic change in the platform 102 may occur based on a user request to elevate privileges. For example, while initial authentication procedures may restrict the platform 102 to loading a relatively lowest privileged OS when the SSID is indicative of a public place (e.g., a coffee shop), the user of the platform 102 may wish to access a relatively higher privileged state of the platform 102. If so, the example context manager 208 may reacquire context information to confirm current environmental conditions (e.g., determine whether the platform 102 still near the same SSID), and/or require particular elevation procedures dictated by the example platform profile table 300. Assume, for the sake of this example that the platform 102 is currently near and/or otherwise connected to a network associated with the SSID "MainStreetCoffee" 320. Additionally, the SSID "MainStreetCoffee" 320 corresponds to a relatively lowest privileged OS (see the example OS privilege column 304) and a relatively lowest privileged disk access configuration (see the example disk privilege column 306).

However, the example privilege elevate column 308 identifies an opportunity to elevate the OS and the disk privileges to a full (highest) state if a VPN connection is established 322. If those conditions are met, the example boot loader manager 204 instructs the example boot loader 106 to load an OS image for the Enterprise OS, and the example disk privilege manager 212 instructs the example file system manager 108 to allow access to all available disk volumes (e.g., the first volume 112a, the second volume 112b, the third volume 112c and the fourth volume 112d).

In some examples, the privilege engine 116 checks environmental conditions of the platform 102 on a periodic, aperiodic, scheduled and/or manual basis to determine whether a previously detected/connected SSID has changed. For example, if the platform 102 is a mobile personal computer, then it can be moved from a first location to a second location. In the event that the second location is deemed less secure, then examples disclosed herein react to the new environmental conditions to reduce the risk of unauthorized access to the platform 102 and/or resources available to the platform 102. In response to the example context manager 208 detecting that an updated SSID proximate to the platform 102 is associated with a relatively lower privilege (as determined by the example platform profile table 300), the example policy manager 210 determines that current privileges of the platform 102 should be revoked. The example boot loader manager 204 instructs the example boot loader 106 to load a new OS image having the relatively lower privilege level (e.g., a cloud OS), and the example disk privilege manager 212 instructs the example file system manager 108 to disable platform access to one or more volumes of the storage 112. In some examples, the privilege engine 116 saves the complete user state of the platform 102 in memory and/or in storage 112 before revoking the access privileges. In that way, the user of the example platform 102 may re-establish the relatively higher privileges of the platform 102 if proper authentication credentials are subsequently provided, as described above.

While an example manner of implementing the example privilege engine 116 of FIG. 1 is illustrated in FIG. 2, one or more of the elements, processes and/or devices illustrated in FIGS. 1 and 2 may be combined, divided, re-arranged, omitted, eliminated and/or implemented in any other way. Further, the example platform power change monitor 202, the example boot loader manager 204, the example authentication input manager 206, the example context manager 208, the example policy manager 210, the example disk privilege manager 212, the example boot loader 106, the example file system manager 108, the example platform policy storage 118 and/or, more generally, the example privilege engine 116 of FIGS. 1 and 2 may be implemented by hardware, software, firmware and/or any combination of hardware, software and/or firmware. Thus, for example, any of the example platform power change monitor 202, the example boot loader manager 204, the example authentication input manager 206, the example context manager 208, the example policy manager 210, the example disk privilege manager 212, the example boot loader 106, the example file system manager 108, the example platform policy storage 118 and/or, more generally, the example privilege engine 116 of FIGS. 1 and 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example platform power change monitor 202, the example boot loader manager 204, the example authentication input manager 206, the example context manager 208, the example policy manager 210, the example disk privilege manager 212, the example boot loader 106, the example file system manager 108, the example platform policy storage 118 and/or, more generally, the example privilege engine 116 of FIGS. 1 and 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example privilege engine 116 of FIGS. 1 and 2 may include one or more elements, processes and/or devices in addition to, or instead of, those illustrated in FIGS. 1 and 2, and/or may include more than one of any or all of the illustrated elements, processes and devices.

Flowcharts representative of example machine readable instructions for implementing the privilege engine 116, the boot loader 106 and/or the file system manager 108 of FIGS. 1 and 2 are shown in FIGS. 4-8. In these examples, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4-8, many other methods of implementing the example privilege engine 116, the example boot loader 106 and/or the example file system manager 108 may alternatively be used. For example, the order of execution of the blocks may be changed, and/or some of the blocks described may be changed, eliminated, or combined.

As mentioned above, the example processes of FIGS. 4-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
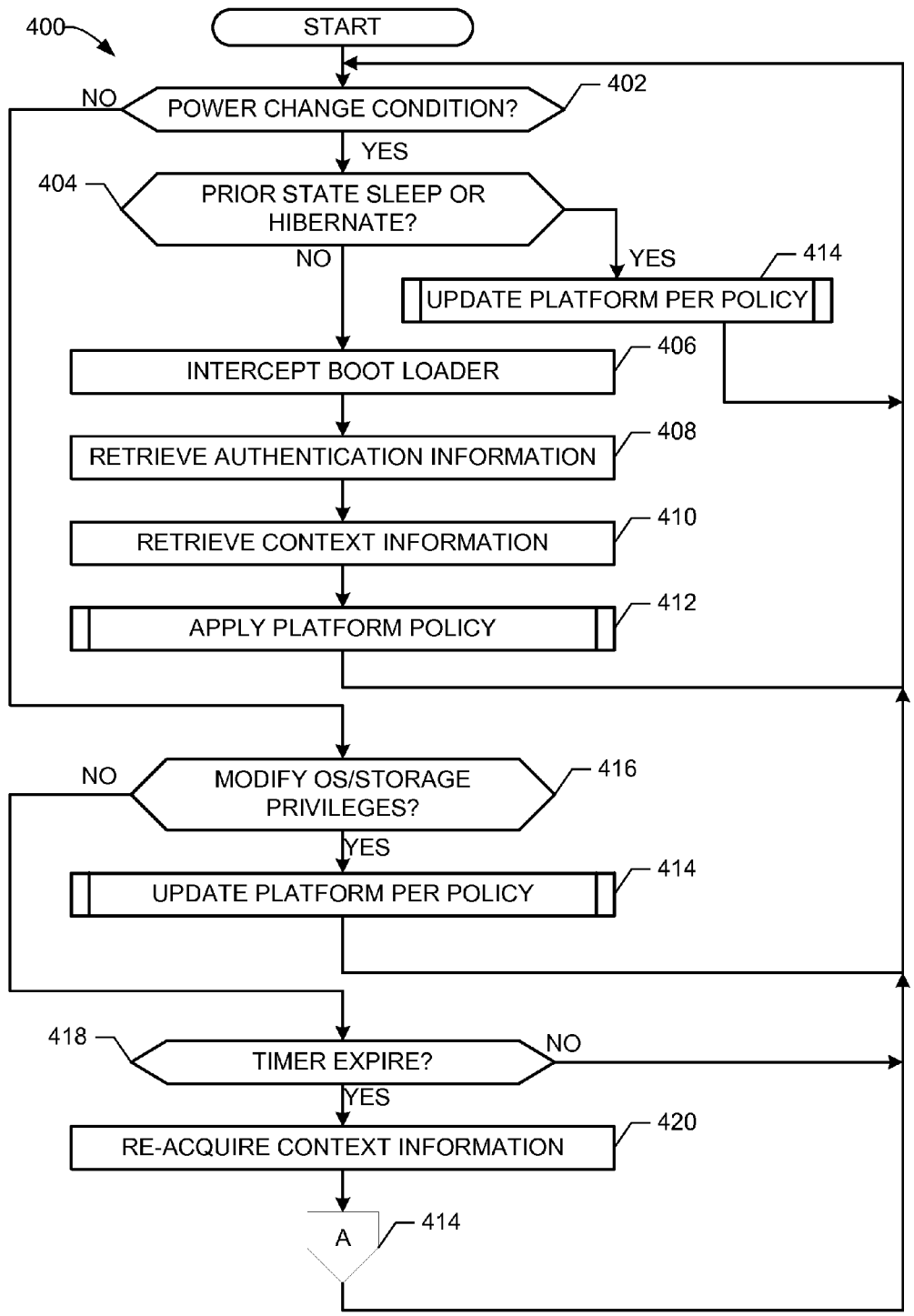
FIGS. 4-8 are flowcharts representative of example machine readable instructions that may be executed to initialize a platform in a manner consistent with the teachings of this disclosure.

The program 400 of FIG. 4 begins at block 402 where the example platform power change monitor 202 determines whether a power change condition has occurred. As described above, the example platform 102 may be powered on from a prior unpowered state, in which a cold/hard boot results. In other examples, the platform 102 may be powered on from a prior sleep state or a prior hibernate state. The example platform power change monitor 202 distinguishes between one or more different types of power-on conditions (block 404), such as determining whether the power-on condition is occurring from a prior sleep or hibernate state.

If the example platform power change monitor 202 determines that the example platform 102 has been powered on from a previously unpowered state (i.e., neither a prior sleep state nor a prior hibernate state) (block 404), then the example boot loader manager 204 intercepts the operations of the example boot loader 106 to prevent a default OS image from being loaded on the platform 102 (block 406). As described above, typical platform operation during power-on includes the boot loader 106 loading a default OS image from storage (e.g., storage 112) after the POST is complete. However, examples disclosed herein do not permit a default OS image from being loaded on the example platform 102 and, instead, determine an appropriate OS image to load based on environmental conditions, platform policy, and multi-factor authentication input(s).

The example authentication input manager 206 retrieves authentication information in a manner consistent with authentication instructions stored in the TEE 114 (block 408). For example, rather than rely on authentication policies associated with an OS, examples disclosed herein allow platform managers (e.g., IT personnel) to design multi-factor authentication procedure(s) stored in hardened hardware (e.g., the TEE 114). The example authentication input manager 206 is communicatively connected to the example authentication sensors 120 to retrieve one or more inputs to authenticate a user of the example platform 102. In some examples, the authentication input manager 206 controls one or more output devices (see FIG. 9 below) to issue one or more instructions/prompts to the user for authentication purposes. For example, the authentication input manager 206 may generate a prompt for the user of the platform 102 to apply their finger to the fingerprint reader 126 and/or to position their face in front of the camera 128.

The example context manager 208 collects and/or otherwise detects context information associated with the example platform 102 (block 410). In some examples, the context manager 208 invokes the RF transceiver 130 to determine which WiFi network(s) 134 are near the example platform 102 (block 410). In still other examples, the context manager 208 invokes the RF transceiver 130 to determine which Bluetooth devices are near the example platform 102 (block 410). In some examples, presence of a particular Bluetooth device near the platform 102 is an additional indication that the platform 102 is still under the control and/or management of an authorized user. The example policy manager 210 applies platform policy to the example platform 102 based on the collected authentication information and collected context information (block 412).

Figure 5:
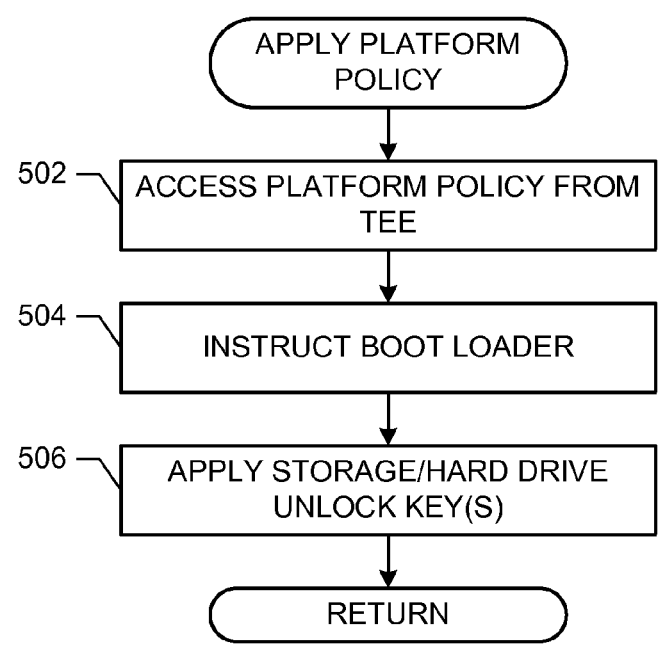
Figure 6:
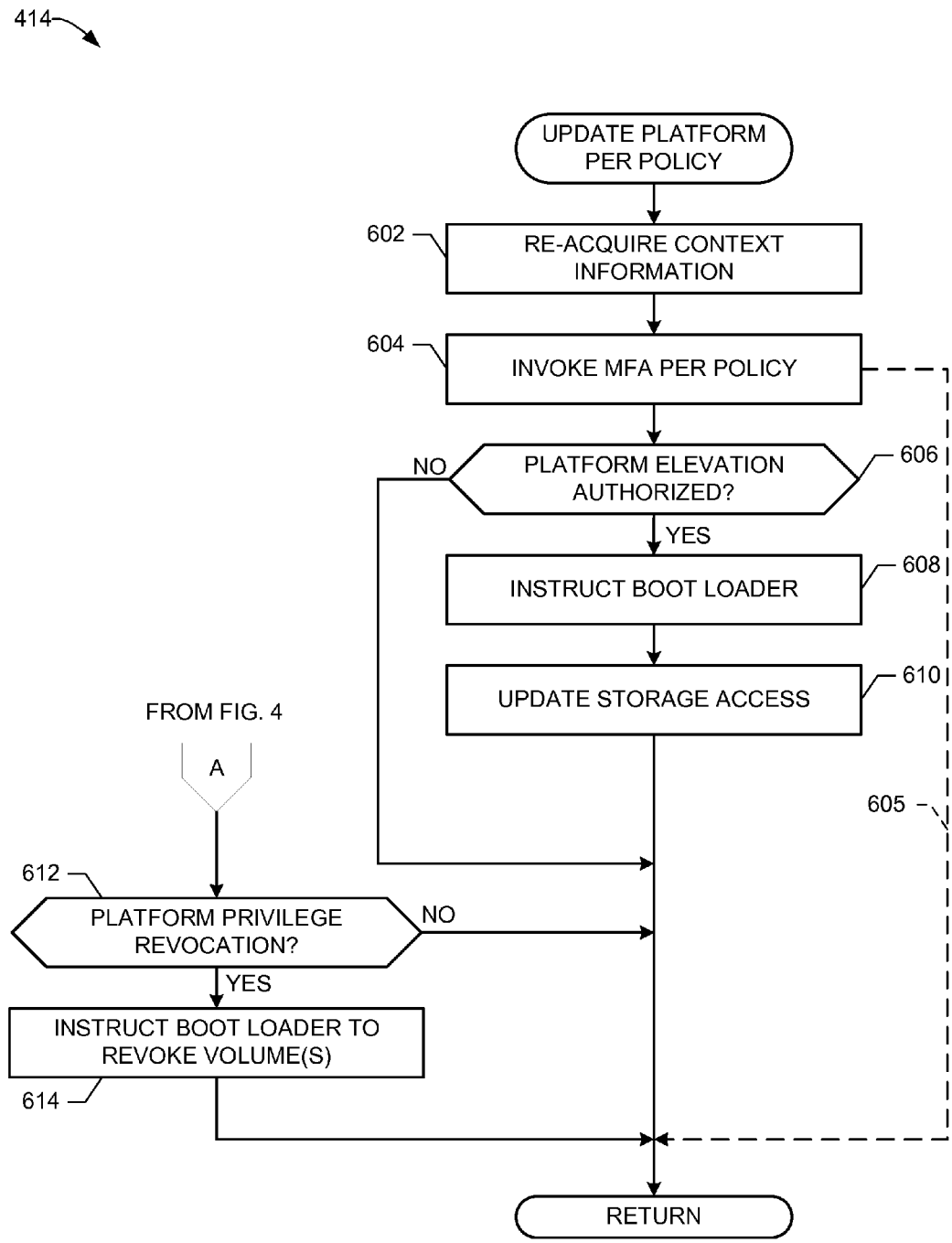

FIG. 5 illustrates additional detail from the example program 400 of FIG. 4 in connection with applying platform policy (block 412). In the illustrated example program 412 of FIG. 5, the policy manager 210 accesses the platform profile table 300 from the TEE 114 (block 502). In some examples, the platform profile table 300 is stored in the example platform policy storage 118 of the TEE 114. As described above in connection with FIG. 3, the example platform profile table 300 identifies one or more configurations of the platform 102 based on one or more environmental conditions. Based on corresponding environmental conditions detected by the example context manager 208 and successful authentication as determined by the example authentication input manager 206, the example boot loader manager 204 instructs the example boot loader 106 to load a corresponding OS image (block 504). Additionally, the example platform profile table 300 identifies one or more configurations for platform storage 112 to be applied to the example platform 102 based on the environmental context (block 506). For example, if the platform 102 is to be booted in the relatively lowest privileged state, the example disk privilege manager 212 limits user access of the storage 112 to the first volume 112a. On the other hand, if the platform 102 is to be booted in the relatively highest privileged state, the example disk privilege manager 212 permits user access of the storage 112 to the all volumes (e.g., the first volume 112a, the second volume 112b, the third volume 112c and the fourth volume 112d).

Returning to the illustrated example of FIG. 4, in the event the platform 102 was in a prior sleep state or hibernate state (block 404), then the example policy manager 210 boots the platform in a manner consistent with platform policy (block 414). As described above, the example platform profile table 300 includes a post hibernate/sleep column 310 to identify boot procedure when the example platform 102 exits a sleep state or a hibernate state. In the illustrated example of FIG. 6, the example context manager 208 re-acquires context information (block 602). For example, during the time in which the platform 102 was in the sleep state or the hibernate state, the platform 102 may have located to an alternate location from when it had entered the sleep state or hibernate state. Based on the instructions of the hibernate/sleep column 310, the example authentication input manager 206 invokes one or more multi-factor authentication procedures (block 604). For example, if the example platform 102 previously entered the sleep or hibernate state when near the "Home" SSID, and subsequently awakens from sleep or hibernate when near that same SSID, then the example platform profile table 300 instructs the authentication input manager 206 to invoke facial recognition and voice recognition authentication procedures. However, in the event that the example platform 102 awakens near an alternate SSID, then the platform is booted in the relatively lowest privilege state (e.g., lowest privileged OS, lowest privileged storage access). The example program 414 of FIG. 6 exits 605, but additional aspects of the example program 414 of FIG. 6 will be discussed in further detail below.

Returning to FIG. 4, in the event that the example platform power change monitor 202 has not identified that a power change condition has occurred on the platform 102 (block 402), then the example policy manager 210 determines whether to modify OS and/or drive access privileges (block 416). In some examples, the policy manager 210 determines and/or otherwise detects whether a modification request to elevate a platform 102 privilege status (e.g., from a user) has occurred. For example, while the platform 102 may initially boot in a first configuration having a first OS privilege and a first storage privilege, the user may request elevation of the privileges. In some examples, the user uses the platform 102 in a relatively lowest privilege because the platform 102 was near or connected to a public access WiFi hotspot. However, the example platform profile table 300 includes a privilege elevate column 308 to identify which conditions, if satisfied, will allow the platform to elevate to a relatively higher privilege operating state. In some examples, the platform privilege status will be elevated if a greater number of authentication factors are used to gain access to the platform. For instance, if a first platform privilege status was established while the platform 102 was in an insecure location (e.g., airport) and required two separate authentication factors to gain a relatively low privilege status, then the example authentication input manager 206 may demand one or more additional authentication factors before allowing platform elevation to occur.

Assuming, for the sake of this example, that the platform is in the relatively lowest privilege operating state associated with connection to and/or proximity to the "MainStreetCoffee" SSID 320, then the privilege elevate column 308 indicates that elevation to a full (e.g., relatively highest) OS image and full storage privilege may occur if connection to a VPN occurs 322. If the user requests to modify the current OS/Storage privileges of the platform (block 416), then control advances to block 414, as discussed above in connection with FIG. 6. After the example context manager 208 re-acquires context information (block 602) and the example authentication input manager 206 invokes one or more authentication types (e.g., voice recognition, facial recognition, keyboard passwords, etc.) (block 604), then the example policy manager 210 determines whether platform elevation is authorized (block 606). Assuming that the example platform 102 connects to the VPN and satisfies the condition(s) listed in the example privilege elevate column 308 (block 606), then the example boot loader manager 204 instructs the example boot loader 106 to load the corresponding higher-priority OS (block 608), and the example disk privilege manager 212 enables/updates access privileges to the storage 112 (block 610).

Returning to the illustrated example of FIG. 4, if the platform power change monitor 202 does not identify a change in the power condition of the platform 102 (block 402), and the policy manager 210 does not receive a request to modify OS/Storage privileges (block 416), then the example context manager 208 determines whether a timer has expired (block 418). For example, the timer may expire after a periodic time, an aperiodic time, or after a particular time-of-day to perform a verification of the environmental conditions of the example platform 102. Generally speaking, because the platform 102 may be a portable computing device, there is a possibility that the platform 102 is in-transit during usage. In the event that the in-transit usage brings the platform 102 from a first location having a generally trusted environment (e.g., an office location) to a second location having a generally less-trusted environment (e.g., a public access point), then the example context manager 208 is invoked after the timer expires to re-acquire context information (block 420). Control advances to block 612 of FIG. 6, where the example policy manager 210 determines whether platform privilege revocation should occur. If not (block 612), the example program 414 exits, but if so (block 612), the example boot loader manager 204 instructs the boot loader 106 to load a relatively lower privilege OS and the example disk privilege manager 212 instructs the storage 112 to remove one or more volume access privileges (block 614). As described above, the state of the platform 102 may be saved to a secure location of the TEE 114 when the platform 102 privilege is revoked so that the user can later continue one or more activities with the example platform 102 after requesting to have privileges elevated.

Figure 7:
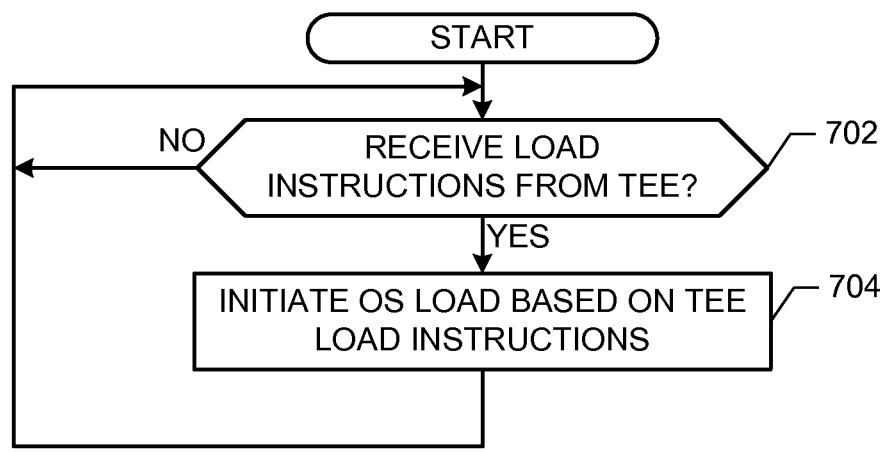

In the illustrated example of FIG. 7, the example boot loader 106 determines whether one or more instructions have been received from the example TEE 114 (block 702). If not (block 702), then the example boot loader 106 waits for further instructions. However, upon receiving instructions from the example TEE 114 (block 702), such as one or more instructions from the example boot loader manager 204, the boot loader 106 initiates loading of the OS identified by the boot loader manager 204 (block 704). Control then returns to block 702 to await further instructions to elevate, revoke or load a particular OS image.

Figure 8:
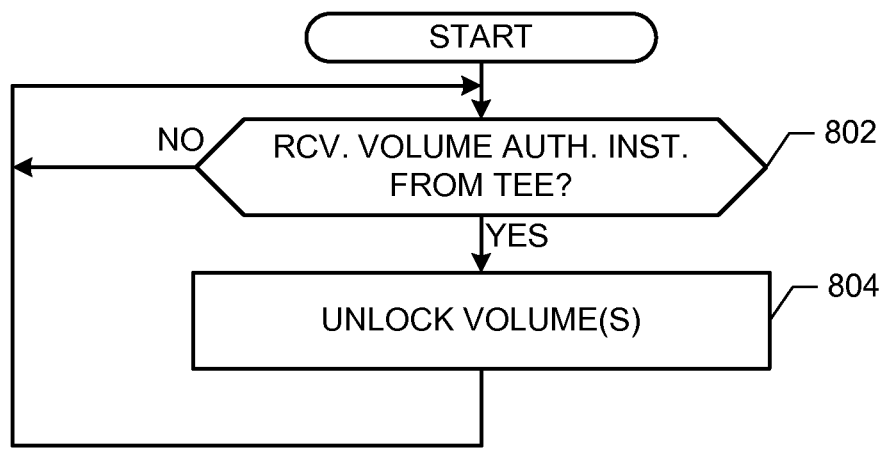

In the illustrated example of FIG. 8, the example file system manager 108 determines whether one or more instructions have been received from the example TEE 114 (block 802). If not (block 802), then the example file system manager 108 waits for further instructions. However, upon receiving instructions from the example TEE 114 (block 802), such as one or more instructions from the example disk privilege manager 212, the file system manager 108 updates access privileges associated with one or more volumes of the storage 112 (e.g., enable/disable privileges to the first volume 112a, the second volume 112b, the third volume 112c and/or the fourth volume 112d) (block 804). Control then returns to block 802 to await further instructions to enable or disable one or more volumes of the storage 112.

Figure 9:
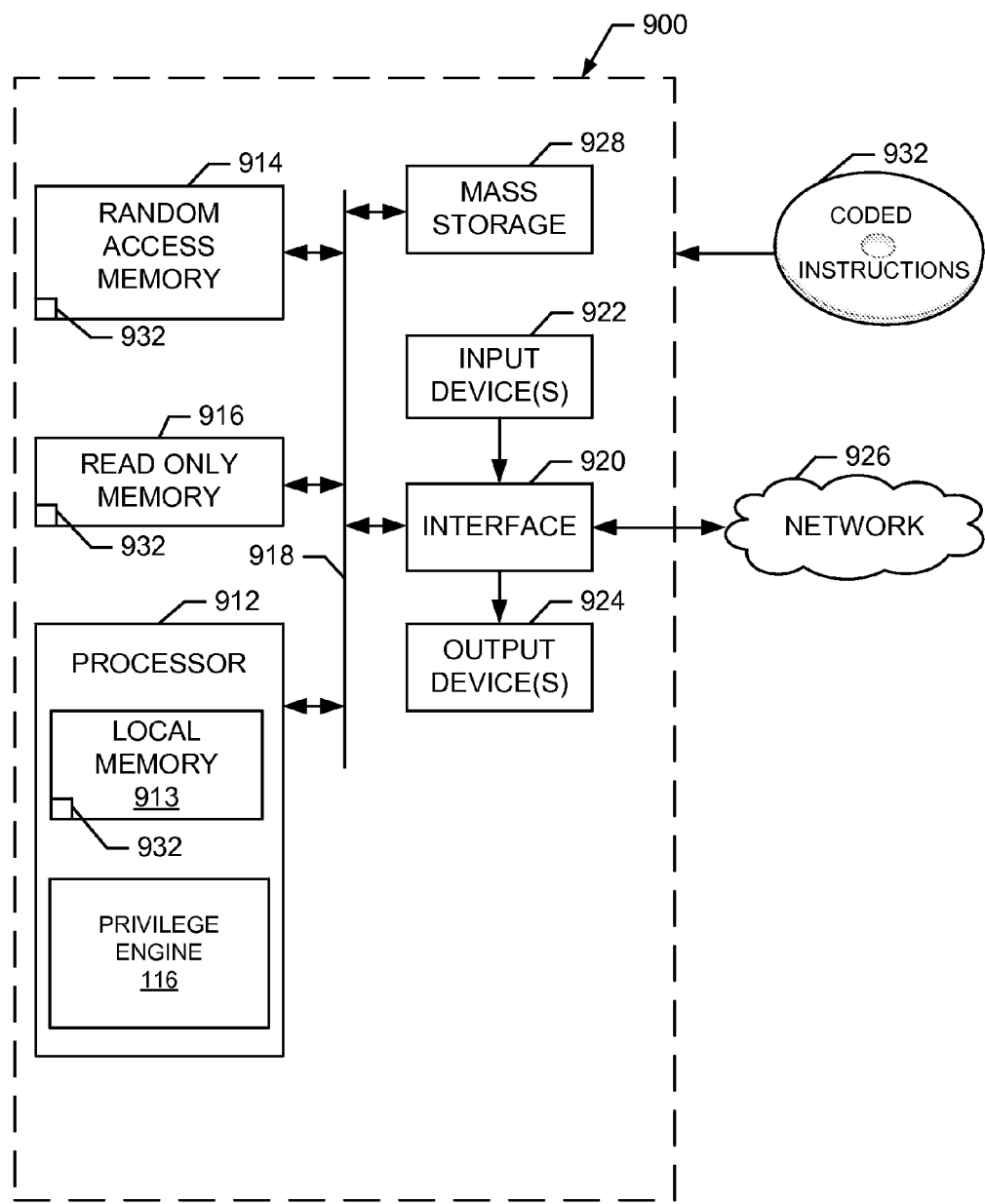
FIG. 9 is a schematic illustration of an example processor platform that may execute the instructions of FIGS. 4-8 to implement the example system of FIGS. 1 and 2.

FIG. 9 is a block diagram of an example processor platform 900 capable of executing the instructions of FIGS. 4-8 to implement the privilege engine 116, the platform policy storage 118, the boot loader 106 and/or the file system manager 108 of FIGS. 1 and 2. The processor platform 900 can be, for example, a server, a personal computer, a mobile device (e.g., a cell phone, a smart phone, a tablet such as an iPad™), a personal digital assistant (PDA), an Internet appliance, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The processor 912 also includes the example privilege engine 116, which includes the example platform power change monitor 202, the example boot loader manager 204, the example authentication input manager 206, the example context manager 208, the example policy manager 210 and/or the example disk privilege manager 212.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system. As described above, the input device(s) may include any type of sensor to assist authentication of the example platform 102, such as biometric sensor(s) to capture fingerprint information, facial features, vein detection, heartbeat detection, galvanic response(s), etc.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 4-8 may be stored in the mass storage device 928, in the volatile memory 914, in the non-volatile memory 916, and/or on a removable tangible computer readable storage medium such as a CD or DVD.

The following examples, which include subject matter such as an apparatus to initialize a platform, a method to initialize a platform, at least one machine-readable medium instructions that, when performed by a machine cause the machine to perform platform initialization and/or a system to initialize a platform, are disclosed herein.

Example 1 is an apparatus to initialize a platform, which includes a boot loader manager to prevent operating system loading in response to detecting a power-on condition, a context manager to retrieve first context information associated with the platform, and a policy manager to identify a first operating system based on the first context information, the policy manager to authorize the boot loader manager to load the first operating system.

Example 2 includes the subject matter of example 1, and also includes a platform power change monitor to distinguish a type of the power-on condition.

Example 3 includes the subject matter of example 2, wherein the type of the power-on condition comprises at least one of a cold boot power-on condition, a power-on after a sleep state, or a power-on after a hibernate state.

Example 4 includes the subject matter of example 1, wherein the policy manager is to compare the first context information to a platform profile table to identify the first operating system when a first service set identifier (SSID) is detected.

Example 5 includes the subject matter of example 4, and also includes a disk privilege manager to authorize a portion of platform storage based on the SSID.

Example 6 includes the subject matter of example 1, and also includes a platform power change monitor to determine a prior platform state as at least one of a sleep state or a hibernate state.

Example 7 includes the subject matter of example 6, wherein the context manager is to retrieve second context information associated with the platform when the prior platform state comprises at least one of the sleep state or the hibernate state.

Example 8 includes the subject matter of example 7, wherein the policy manager is to determine if the first context information is different than the second context information.

Example 9 includes the subject matter of example 8, wherein the policy manager is to permit the first operating system to be loaded on the platform when the first context information is not different than the second context information.

Example 10 includes the subject matter of example 8, wherein the policy manager is to prohibit the first operating system from being loaded on the platform when the first context information is different than the second context information.

Example 11 includes the subject matter of example 10, wherein the boot loader manager is to load a second operating system having a relatively lower privilege status than the first operating system.

Example 12 includes the subject matter of example 8, and also includes a disk privilege manager to maintain a previously established disk access privilege when the first context information is not different than the second context information.

Example 13 includes the subject matter of example 1, wherein the policy manager is to detect a request to elevate a privilege status of the platform.

Example 14 includes the subject matter of example 13, and also includes an authentication input manager to generate a request for a set of authentication factors.

Example 15 includes the subject matter of examples 1 and/or 2, wherein the type of the power-on condition comprises at least one of a cold boot power-on condition, a power-on after a sleep state, or a power-on after a hibernate state.

Example 16 includes the subject matter of examples 4 and/or 5, and also includes a platform power change monitor to determine a prior platform state as at least one of a sleep state or a hibernate state, wherein the context manager is to retrieve second context information associated with the platform when the prior platform state comprises at least one of the sleep state or the hibernate state.

Example 17 includes the subject matter of examples 13 and/or 14, and also includes a disk privilege manager to maintain a previously established disk access privilege when the first context information is not different than the second context information.

Example 18 includes a method to initialize a platform, and also includes preventing operating system loading in response to detecting a power-on condition, retrieving first context information associated with the platform, identifying a first operating system based on the first context information, and authorizing, with the processor, loading of the first operating system.

Example 19 includes the subject matter of example 18, and also includes distinguishing a type of the power-on condition.

Example 20 includes the subject matter of example 19, and also includes identifying at least one of a cold boot power-on condition, a power-on after a sleep state, or a power-on after a hibernate state.

Example 21 includes the subject matter of example 18, and also includes comparing the first context information to a platform profile table to identify the first operating system when a first service set identifier (SSID) is detected.

Example 22 includes the subject matter of example 21, and also includes authorizing a portion of platform storage based on the SSID.

Example 23 includes the subject matter of example 18, and also includes determining a prior platform state as at least one of a sleep state or a hibernate state.

Example 24 includes the subject matter of example 23, and also includes retrieving second context information associated with the platform when the prior platform state comprises at least one of the sleep state or the hibernate state.

Example 25 includes the subject matter of example 24, and also includes determining if the first context information is different than the second context information.

Example 26 includes the subject matter of example 25, and also includes permitting the first operating system to be loaded on the platform when the first context information is not different than the second context information.

Example 27 includes the subject matter of example 25, and also includes prohibiting the first operating system from being loaded on the platform when the first context information is different than the second context information.

Example 28 includes the subject matter of example 27, and also includes loading a second operating system having a relatively lower privilege status than the first operating system.

Example 29 includes the subject matter of example 25, and also includes maintaining a previously established disk access privilege when the first context information is not different than the second context information.

Example 30 includes the subject matter of example 18, and also includes detecting a request to elevate a privilege status of the platform.

Example 31 includes the subject matter of example 30, and also includes generating a request for a set of authentication factors.

Example 32 includes the subject matter of examples 18-20, and also includes comparing the first context information to a platform profile table to identify the first operating system when a first service set identifier (SSID) is detected, and authorizing a portion of platform storage based on the SSID.

Example 33 includes the subject matter of examples 18-20, and also includes determining a prior platform state as at least one of a sleep state or a hibernate state, retrieving second context information associated with the platform when the prior platform state comprises at least one of the sleep state or the hibernate state, and determining if the first context information is different than the second context information.

Example 34 is a tangible machine readable storage medium comprising machine readable instructions that, when executed, cause a machine to at least prevent operating system loading in response to detecting a power-on condition, retrieve first context information associated with the platform, identify a first operating system based on the first context information, and authorize loading of the first operating system.

Example 35 includes the subject matter of example 34, and also includes instructions to distinguish a type of the power-on condition.

Example 36 includes the subject matter of example 35, and also includes instructions to identify at least one of a cold boot power-on condition, a power-on after a sleep state, or a power-on after a hibernate state.

Example 37 includes the subject matter of example 34, and also includes instructions to compare the first context information to a platform profile table to identify the first operating system when a first service set identifier (SSID) is detected.

Example 38 includes the subject matter of example 37, and also includes instructions to authorize a portion of platform storage based on the SSID.

Example 39 includes the subject matter of example 1, and also includes instructions to determine a prior platform state as at least one of a sleep state or a hibernate state.

Example 40 includes the subject matter of example 39, and also includes instructions to retrieve second context information associated with the platform when the prior platform state comprises at least one of the sleep state or the hibernate state.

Example 41 includes the subject matter of example 40, and also includes instructions to determine if the first context information is different than the second context information.

Example 42 includes the subject matter of example 41, and also includes instructions to permit the first operating system to be loaded on the platform when the first context information is not different than the second context information.

Example 43 includes the subject matter of example 41, and also includes instructions to prohibit the first operating system from being loaded on the platform when the first context information is different than the second context information.

Example 44 includes the subject matter of example 43, and also includes instructions to load a second operating system having a relatively lower privilege status than the first operating system.

Example 45 includes the subject matter of example 41, and also includes instructions to maintain a previously established disk access privilege when the first context information is not different than the second context information.

Example 46 includes the subject matter of example 34, and also includes instructions to detect a request to elevate a privilege status of the platform.

Example 47 includes the subject matter of example 46, and also includes instructions to generate a request for a set of authentication factors.

Example 48 includes the subject matter of examples 34-36, and also includes instructions to compare the first context information to a platform profile table to identify the first operating system when a first service set identifier (SSID) is detected, and authorize a portion of platform storage based on the SSID.

Example 49 includes the subject matter of examples 34-36, and also includes instructions to determine a prior platform state as at least one of a sleep state or a hibernate state, retrieve second context information associated with the platform when the prior platform state comprises at least one of the sleep state or the hibernate state, and determine if the first context information is different than the second context information.

Example 50 includes a system to initialize a platform, and also includes means for preventing operating system loading in response to detecting a power-on condition, means for retrieving first context information associated with the platform, means for identifying a first operating system based on the first context information, and means for authorizing loading of the first operating system.

Example 51 includes the subject matter of example 50, and also includes means for distinguishing a type of the power-on condition.

Example 52 includes the subject matter of example 51, and also includes means for identifying at least one of a cold boot power-on condition, a power-on after a sleep state, or a power-on after a hibernate state.

Example 53 includes the subject matter of example 50, and also includes means for comparing the first context information to a platform profile table to identify the first operating system when a first service set identifier (SSID) is detected.

Example 54 includes the subject matter of example 53, and also includes means for authorizing a portion of platform storage based on the SSID.

Example 55 includes the subject matter of example 50, and also includes means for determining a prior platform state as at least one of a sleep state or a hibernate state.

Example 56 includes the subject matter of example 55, and also includes means for retrieving second context information associated with the platform when the prior platform state comprises at least one of the sleep state or the hibernate state.

Example 57 includes the subject matter of example 56, and also includes means for determining if the first context information is different than the second context information.

Example 58 includes the subject matter of example 57 and also includes means for permitting the first operating system to be loaded on the platform when the first context information is not different than the second context information.

Example 59 includes the subject matter of example 57, and also includes means for prohibiting the first operating system from being loaded on the platform when the first context information is different than the second context information.

Example 60 includes the subject matter of example 59, and also includes means for loading a second operating system having a relatively lower privilege status than the first operating system.

Example 61 includes the subject matter of example 57, and also includes means for maintaining a previously established disk access privilege when the first context information is not different than the second context information.

Example 62 includes the subject matter of example 50, and also includes means for detecting a request to elevate a privilege status of the platform.

Example 63 includes the subject matter of example 62, and also includes means for generating a request for a set of authentication factors.

Example 64 includes the subject matter of examples 50-52, and also includes means for comparing the first context information to a platform profile table to identify the first operating system when a first service set identifier (SSID) is detected, and means for authorizing a portion of platform storage based on the SSID.

Example 65 includes the subject matter of examples 50-52, and also includes means for determining a prior platform state as at least one of a sleep state or a hibernate state, means for retrieving second context information associated with the platform when the prior platform state comprises at least one of the sleep state or the hibernate state, and means for determining if the first context information is different than the second context information.

From the foregoing, it will be appreciated that the above disclosed methods, apparatus, systems and/or articles of manufacture have been disclosed to initialize a platform. Rather than rely on an operating system and/or BIOS to enforce a manner of platform initialization, examples disclosed herein enable a trusted execution environment to determine one or more multi-factor authentication credentials combined with one or more environmental context information associated with the platform to determine a preferred and/or otherwise appropriate privilege operating state of the platform. Security of the platform is enhanced with any number of different authentication requirements in view of the varying differences in safety in which the platform may be used.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to initialize a platform, comprising:
a boot loader manager to prevent loading of a default operating system in response to detecting a power-on condition, the default operating system including a default password policy security level, and the platform in a prior power state before the power-on condition;
a platform power change monitor to:
identify a type of the power-on condition; and
identify a type of the prior power state of the platform;
a context manager to retrieve first context information associated with the platform; and
a policy manager to:
reduce a security risk associated with the default operating system by identifying a first operating system based on a profile match of (a) the first context information, (b) the type of the power-on condition, and (c) the type of the prior power state, the first operating system including a first password policy security level greater than that of the default operating system, the policy manager to authorize the boot loader manager to load the first operating system instead of the default operating system.

2. An apparatus as defined in claim 1, wherein the type of the power-on condition includes at least one of a cold boot power-on condition, a power-on after a sleep state, or a power-on after a hibernate state.

3. An apparatus as defined in claim 1, wherein the policy manager is to identify the profile match by comparing the first context information to a platform profile table to identify the first operating system when a first service set identifier (SSID) is detected.

4. An apparatus as defined in claim 3, further including a disk privilege manager to authorize a portion of platform storage based on the SSID.

5. An apparatus as defined in claim 1, wherein the platform power change monitor is to determine the type of the prior power state of the platform as at least one of a sleep state or a hibernate state.

6. An apparatus as defined in claim 5, wherein the context manager is to retrieve second context information associated with the platform when the type of the prior power state of the platform includes at least one of the sleep state or the hibernate state.

7. An apparatus as defined in claim 6, wherein the policy manager is to determine if the first context information is different than the second context information.

8. An apparatus as defined in claim 7, wherein the policy manager is to permit the first operating system to be loaded on the platform when the first context information is not different than the second context information.

9. An apparatus as defined in claim 7, wherein the policy manager is to prohibit the first operating system from being loaded on the platform when the first context information is different than the second context information.

10. An apparatus as defined in claim 9, wherein the boot loader manager is to load a second operating system having a relatively lower privilege status than the first operating system when the first context information is different than the second context information.

11. An apparatus as defined in claim 7, further including a disk privilege manager to maintain a previously established disk access privilege when the first context information is not different than the second context information.

12. An apparatus as defined in claim 1, wherein the policy manager is to detect a request to elevate a privilege status of the platform.

13. A method to initialize a platform, comprising:
preventing, by executing an instruction with a processor, loading of a default operating system in response to detecting a power-on condition, the default operating system including a default password policy security level, and the platform in a prior power state before the power-on condition;
identifying, by executing an instruction with the processor, a type of the power-on condition and a type of the prior power state of the platform;
retrieving, by executing an instruction with the processor, first context information associated with the platform;
reducing, by executing an instruction with the processor, a security risk associated with the default operating system by identifying a first operating system based on a profile match of (a) the first context information, (b) the type of the power-on condition, and (c) the type of the prior power state, the first operating system including a first password policy security level greater than that of the default operating system; and
authorizing, by executing an instruction with the processor, loading of the first operating system instead of the default operating system.

14. A method as defined in claim 13, further including identifying at least one of a cold boot power-on condition, a power-on after a sleep state, or a power-on after a hibernate state.

15. A method as defined in claim 13, further including identifying the profile match by comparing the first context information to a platform profile table to identify the first operating system when a first service set identifier (SSID) is detected.

16. A method as defined in claim 15, further including authorizing a portion of platform storage based on the SSID.

17. A method as defined in claim 13, further including determining the type of the prior power state of the platform as at least one of a sleep state or a hibernate state.

18. A method as defined in claim 17, further including retrieving second context information associated with the platform when the type of the prior power state of the platform includes at least one of the sleep state or the hibernate state.

19. A tangible machine readable storage medium comprising machine readable instructions which, when executed, cause a machine to at least:
prevent loading of a default operating system in response to detecting a power-on condition, the default operating system including a default password policy security level, and the platform in a prior power state before the power-on condition;
determine a type of the power-on condition and a type of the prior power state of the platform;
retrieve first context information associated with the platform;
reduce a security risk associated with the default operating system by identifying a first operating system based on a profile match of (a) the first context information, (b) the type of the power-on condition, and (c) the type of the prior power state, the first operating system including a first password policy security level greater than that of the default operating system; and
authorize loading of the first operating system instead of the default operating system.

20. A storage medium as defined in claim 19, wherein the machine readable instructions, when executed, further cause the machine to identify at least one of a cold boot power-on condition, a power-on after a sleep state, or a power-on after a hibernate state.

21. A storage medium as defined in claim 19, wherein the machine readable instructions, when executed, further cause the machine to identify the profile match by comparing the first context information to a platform profile table to identify the first operating system when a first service set identifier (SSID) is detected.

22. A storage medium as defined in claim 21, wherein the machine readable instructions, when executed, further cause the machine to authorize a portion of platform storage based on the SSID.

* * * * *